United States Patent
Akimoto (10) Patent No.: US 9,816,480 B2
(45) Date of Patent: Nov. 14, 2017

(54) SINGLE BUCKET DRAG-TYPE TURBINE AND WAVE POWER GENERATOR

(71) Applicant: Albatross Technology LLC, Tokyo (JP)

(72) Inventor: Hiromichi Akimoto, Tokyo (JP)

(73) Assignee: ALBATROSS TECHNOLOGY LLC, Tokyo (JP)

( * ) Notice: Subject to any disclaimer, the term of this patent is extended or adjusted under 35 U.S.C. 154(b) by 236 days.

(21) Appl. No.: 14/441,077

(22) PCT Filed: Nov. 14, 2012

(86) PCT No.: PCT/JP2012/079533
§ 371 (c)(1),
(2) Date: May 6, 2015

(87) PCT Pub. No.: WO2014/076782
PCT Pub. Date: May 22, 2014

(65) Prior Publication Data
US 2015/0285211 A1    Oct. 8, 2015

(51) Int. Cl.
*F03B 13/18*    (2006.01)

(52) U.S. Cl.
CPC ........ *F03B 13/183* (2013.01); *F03B 13/1825* (2013.01); *Y02E 10/28* (2013.01); *Y02E 10/38* (2013.01)

(58) Field of Classification Search
CPC .... F03B 13/183; F03B 13/1825; Y02E 10/28; Y02E 10/38
See application file for complete search history.

(56) References Cited

U.S. PATENT DOCUMENTS

| | | | | |
|---|---|---|---|---|
| 1,786,057 | A * | 12/1930 | Fales | F03D 1/0608 416/127 |
| 4,325,674 | A * | 4/1982 | Ljungstrom | F03D 3/061 416/139 |
| 4,329,116 | A * | 5/1982 | Ljungstrom | F03D 3/061 416/132 B |
| 4,517,467 | A * | 5/1985 | Fuhring | F03D 5/005 290/44 |

(Continued)

FOREIGN PATENT DOCUMENTS

| CN | 2037004 U | 5/1989 |
|---|---|---|
| CN | 202325995 U | 7/2012 |

(Continued)

OTHER PUBLICATIONS

Written opinion of the International Searching Authority issued in corresponding application PCT/JP2012/079533, dated Feb. 4, 2013 and dated Feb. 12, 2013.

(Continued)

*Primary Examiner* — Igor Kershteyn
(74) *Attorney, Agent, or Firm* — Griffin and Szipl PC (57) ABSTRACT

The present invention provides a drag-type turbine capable of efficiently extracting kinetic energy of fluid particles orbiting in waves and a wave power generator comprising said drag-type turbine. This turbine is a single bucket drag-type turbine with a single half-pipe bucket and a counterweight oppositely facing the bucket, where fluid particles in orbital motion in a wave impel the bucket and the counterweight to rotate them as a unitary body.

7 Claims, 7 Drawing Sheets

(56) References Cited

U.S. PATENT DOCUMENTS

| | | | | |
|---|---|---|---|---|
| 4,561,826 A | * | 12/1985 | Taylor | F03D 3/061 |
| | | | | 416/117 |
| 4,582,013 A | * | 4/1986 | Holland, Jr. | B63H 9/02 |
| | | | | 114/39.3 |
| 4,692,094 A | * | 9/1987 | Kulinyak | F03D 7/0204 |
| | | | | 416/11 |
| 6,702,552 B1 | * | 3/2004 | Harman | B63H 1/26 |
| | | | | 416/19 |
| 8,584,475 B2 | * | 11/2013 | Scesney | B01D 5/0039 |
| | | | | 290/55 |
| 2005/0079054 A1 | | 4/2005 | Kurita | |
| 2013/0094962 A1 | * | 4/2013 | Wesby | F03D 3/005 |
| | | | | 416/1 |

FOREIGN PATENT DOCUMENTS

| | | |
|---|---|---|
| DE | 10 2009 035 928 A1 | 12/2010 |
| DE | 10 2011 009 688 A1 | 8/2012 |
| GB | 2 119 449 A | 11/1983 |
| GB | 2 164 097 A | 3/1986 |
| GB | 2 425 154 A | 10/2006 |
| JP | 51-67854 | 6/1976 |
| JP | 51-67854 A | 6/1976 |
| JP | 56-044468 A | 4/1981 |
| JP | 56-0444468 A | 4/1981 |
| JP | 2008-064106 A | 3/2008 |
| JP | 2009-221999 A | 10/2009 |
| JP | 2012-107614 A | 6/2012 |
| KR | 10-2003-0085113 A | 11/2003 |
| KR | 10-2011-0036417 A | 4/2011 |
| KR | 10-2012-0081790 A | 7/2012 |
| WO | 2008/063086 A2 | 5/2008 |

OTHER PUBLICATIONS

Faizal, Mohammed et al., "On utilizing the orbital motion in water waves to drive a Saonvius rotor," Renewable Energy 35 (2010) 164-169.
International Search Report ssued in corresponding application PCT/JP2012/079533, dated Feb. 4, 2013 and dated Feb. 12, 2013.
Extended European Search Report issued in corresponding application 12 88 8434, completed Nov. 4, 2015 and dated Nov. 12, 2015.
Japanese Office Action issued in corresponding application 2014-546774, completed Mar. 30, 2016 and dated Apr. 1, 2016 (no translation available; submitted for certification).
Chinese Office Action issued in corresponding application 201280077082.9, completed May 17, 2016 and dated Jun. 2, 2016 (no translation available; submitted for certification).

* cited by examiner

Prior Art

SINGLE BUCKET DRAG-TYPE TURBINE AND WAVE POWER GENERATOR

This is a National Phase Application in the United States of International Patent Application No. PCT/JP2012/079533 filed Nov. 14, 2012, the entire disclosure of which is hereby incorporated by reference.

TECHNICAL FIELD

The present invention relates to a natural energy extraction apparatus

BACKGROUND ART

Figure 1:
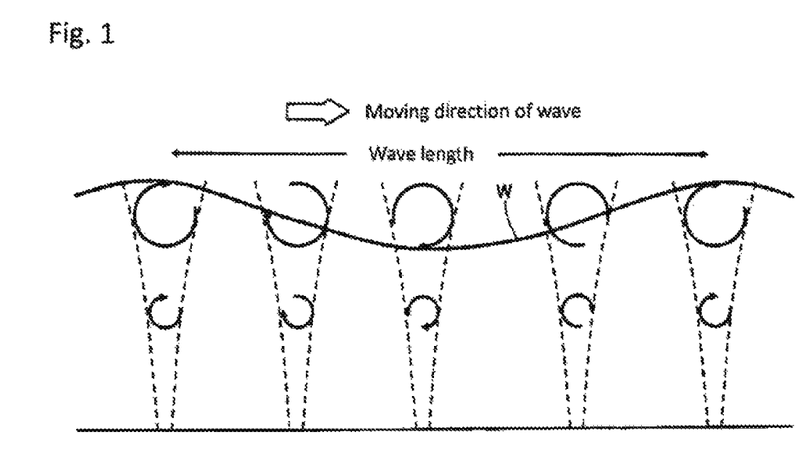
FIG. 1 is a view showing an example of fluid particles orbiting in waves.

As shown in FIG. 1, orbiting fluid particles describe elliptical paths in a wave W. The velocity vectors of the fluid particles describing the elliptical paths are directed in the moving direction of the wave at crests of the wave, directed downward midway between the crest and the bottom of the wave, directed opposite to the moving direction of the wave at the bottom of the wave, and directed upward midway between the bottom and the next crest of the wave. Non-patent document No. 1 discloses fundamental research results about rotation of a drag-type turbine provided with a plurality of buckets and located in a wave caused by fluid particles orbiting in the wave.

PRIOR ART DOCUMENT

Non-Patent Document

Non-Patent Document No. 1: "On utilizing the orbital motion in water waves to drive a Savoniusrotor" Mohammed Faizal, et al. Renewable Energy, 2010, No. 35, p 164 to 169

DISCLOSURE OF INVENTION

Problem to be Solved

The elliptical orbits of fluid particles in a wave become substantially circular orbits with radii equal to half the amplitude of the wave at a position near the water surface. The velocity of the elliptical orbital motion decreases as distance from the water surface increases. Therefore, it is desirable to locate a drag-type turbine whose buckets have a rotation radius equal to half the amplitude of the wave at a position near the water surface, so that the fluid particles orbiting in the wave rotate the drag-type turbine.

Figure 2:
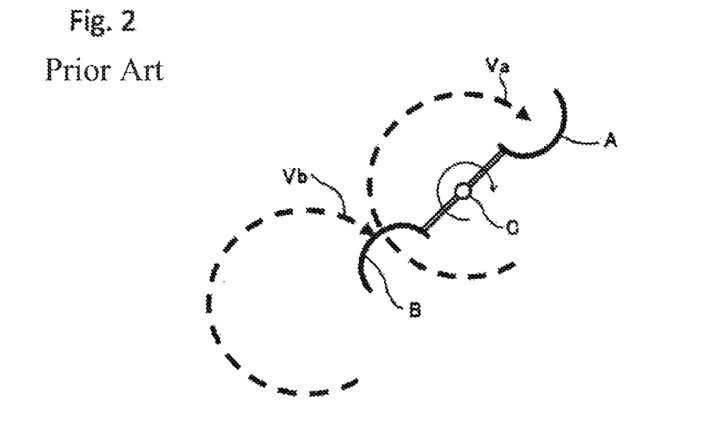
FIG. 2 is a view showing a relation between a drag-type turbine comprising a plurality of buckets and located in waves and flow velocity vectors of fluid particles in waves.

When a drag-type turbine comprising a plurality of buckets, whose buckets have a rotation radius equal to half the amplitude of a wave, is located at a position near the water surface as shown in FIG. 2, the distance between oppositely facing buckets A and B usually becomes far shorter than the wavelength. Therefore, the buckets A and B take positions in the flow velocity vectors Va and Vb of substantially the same phase when the buckets A and B rotate around a rotation center C as a unitary body, so that the rotational torques imparted to the buckets A and B by fluid particles substantially cancel each other, and the torque that can be extracted from orbiting fluid particles by the drag-type turbine becomes only that due to difference between the directions of the buckets.

Therefore, an object of the present invention is to provide a drag-type turbine capable of efficiently extracting orbital kinetic energy of fluid particles orbiting in the waves and a wave power generator comprising said drag-type turbine.

Means for Achieving the Object

In accordance with the present invention, there is provided a single bucket drag-type turbine comprising a single half-pipe bucket and a counterweight oppositely facing the bucket, wherein fluid particles in orbital motion in a wave impel the bucket and the counterweight to rotate them as a unitary body.

Figure 3:
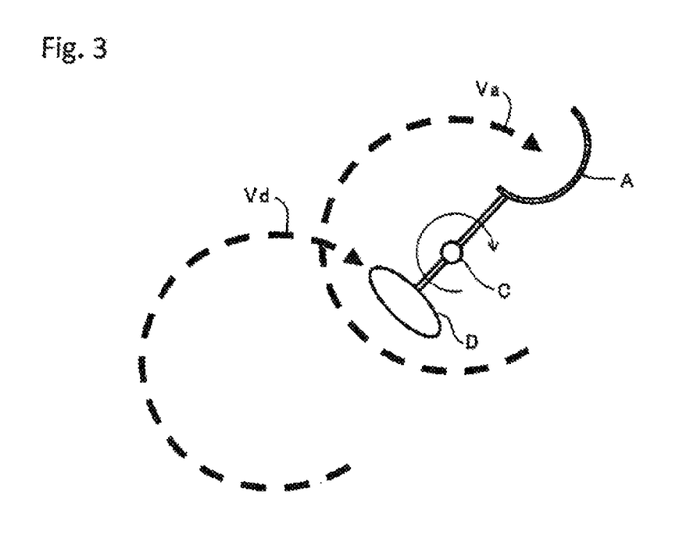
FIG. 3 is a view showing a relation between a single bucket drag-type turbine in accordance with the present invention which is located in waves and flow velocity vectors of fluid particles in the waves.

In the single bucket drag-type turbine of the present invention, a counterweight D radially opposes a bucket A as shown in FIG. 3. Therefore, even if the bucket A and the counterweight D are located in flow velocity vectors Va and Vd of substantially the same phase when the bucket A and the counterweight D rotate around a rotation center C as a unitary body, force imparted to the bucket A by fluid particles becomes far larger than force imparted to the counterweight D by fluid particles insofar as the counterweight D is formed into a shape with small drag, and imparted forces do not cancel each other. Therefore, the single bucket drag-type turbine of the present invention can efficiently extract kinetic energy of fluid particles orbiting in waves.

In accordance with a preferred aspect of the present invention, the bucket is a semi-cylindrical body and the counterweight is a streamline body.

A bucket formed as a semi-cylindrical body has large drag and a counterweight of a streamline body has small drag. Therefore, the aforesaid shapes are desirable for the single bucket drag-type turbine of the present invention.

In accordance with a preferred aspect of the present invention, the single bucket drag-type turbine further comprises a pair of end plates each fixed to one of longitudinal ends of the bucket, and each end plate is provided with the counterweight.

The pair of end plates each fixed to one of longitudinal ends of the bucket help to maintain the two-dimensionality of waves passing by the bucket and stable rotation of the bucket. Using the end plate for fixing the counterweight makes it unnecessary to provide an additional member for fixing the counterweight, thereby helping to decrease the number of components.

In accordance with a preferred aspect of the present invention, the distance between the bucket and a rotation center of the bucket when the bucket is located below the rotation center of the bucket is shorter than that when the bucket is located above the rotation center of the bucket during rotational motion of the bucket and the counterweight as a unitary body.

Figure 4:
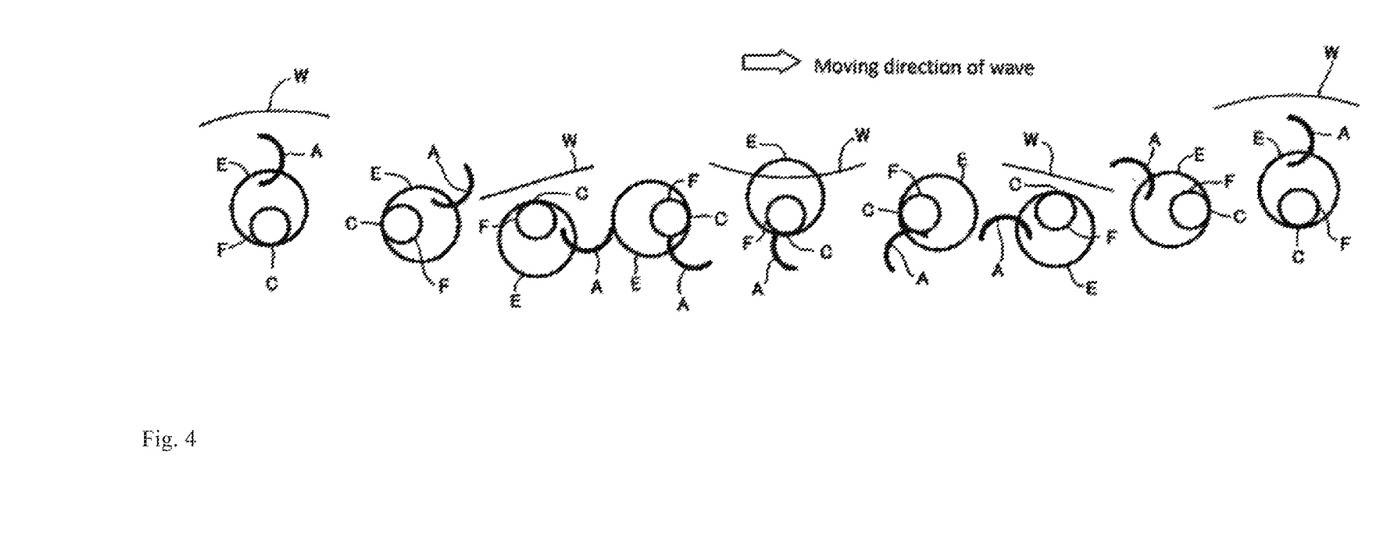
FIG. 4 is a schematic view of a mechanism for varying circumferential velocity of the bucket in accordance with downward decrease in flow velocity of fluid particles in waves.

As can be seen from FIG. 1, the velocity of elliptical orbital motion of fluid particles in waves decreases as distance from the water surface increases. Therefore, when the circumferential velocity of the bucket is constant independent of its rotational position, it sometimes occurs that the circumferential velocity of the bucket when the bucket is located in a lower position becomes larger than the flow velocity of the fluid particles, so that a negative pressure region is formed behind the bucket, whereby the fluid particles resist the rotation of the bucket. As shown in FIG. 4, a bucket A is fixed to a ring E; while the bucket A is directed upward, a lower end of an inner circumferential surface of the ring E abuts on a lower end of an outer circumferential surface of a fixed wheel F of an outer diameter half as large as that of the inner diameter of the ring E; and then the ring E is rotated around the fixed wheel F, with slip between the ring E and the fixed wheel F inhibited. Then, an abutting point between the ring E and the fixed wheel F makes 2 turns around the fixed wheel F, while the bucket A makes 1 turn. The distance between the rotation center C of the bucket A, i.e., the abutting point between the ring E and the fixed wheel F, and the bucket A becomes maximum when the bucket A is located vertically above the rotation center C, decreases as the bucket A descends, and becomes minimum when the bucket A is located vertically below the rotation center C. Therefore, even if the bucket A rotates at a constant angular velocity, the circumferential velocity of the bucket A becomes low when the bucket A is in a lower position where its circumferential velocity comes close to the flow velocity of the fluid particles, which decreases as distance from water surface increases, so that generation of a negative pressure region behind the bucket A is prevented and the fluid particles are prevented from resisting the rotation of the bucket A.

In accordance with a preferred aspect of the present invention, each end plate is a ring, and the single bucket drag-type turbine further comprises a pair of driving wheels. Each driving wheel is provided with a pair of rotatable guide rollers located at the radial middle of the driving wheel and a fixed wheel passing through the center of the driving wheel to be capable of rotation relative to the driving wheel. The pair of rotatable guide rollers and the fixed wheel abut an inner circumferential surface of one of the rings. The inner diameter of the ring is twice as large as the outer diameter of the fixed wheel. The ring goes around the fixed wheel without slipping at the abutting point between the ring and the fixed wheel.

According to the aforesaid structure, the distance between the bucket and the rotation center of the bucket becomes shorter when the bucket is located below the rotation center than that when the bucket is located above the rotation center.

In accordance with a preferred aspect of the present invention, the ring is an internal gear and a part of the fixed wheel abutting the inner circumferential surface of the ring is an external gear, and the internal gear of the ring and the external gear of the fixed wheel mesh with each other.

The aforesaid structure enables the ring to go around the fixed wheel with slip between the ring and the fixed wheel inhibited.

In accordance with the present invention, there is provided a wave power generator comprising any one of the aforesaid single bucket drag-type turbines, a float for rotatably supporting the single bucket drag-type turbine, and a power generator connected to the float so as to be rotated by the single bucket drag-type turbine.

The wave power generator in accordance with the present invention can efficiently extract kinetic energy of fluid particles orbiting in waves and convert it to electric power.

MODE FOR CARRYING OUT THE INVENTION

Embodiment No. 1

Figure 5:
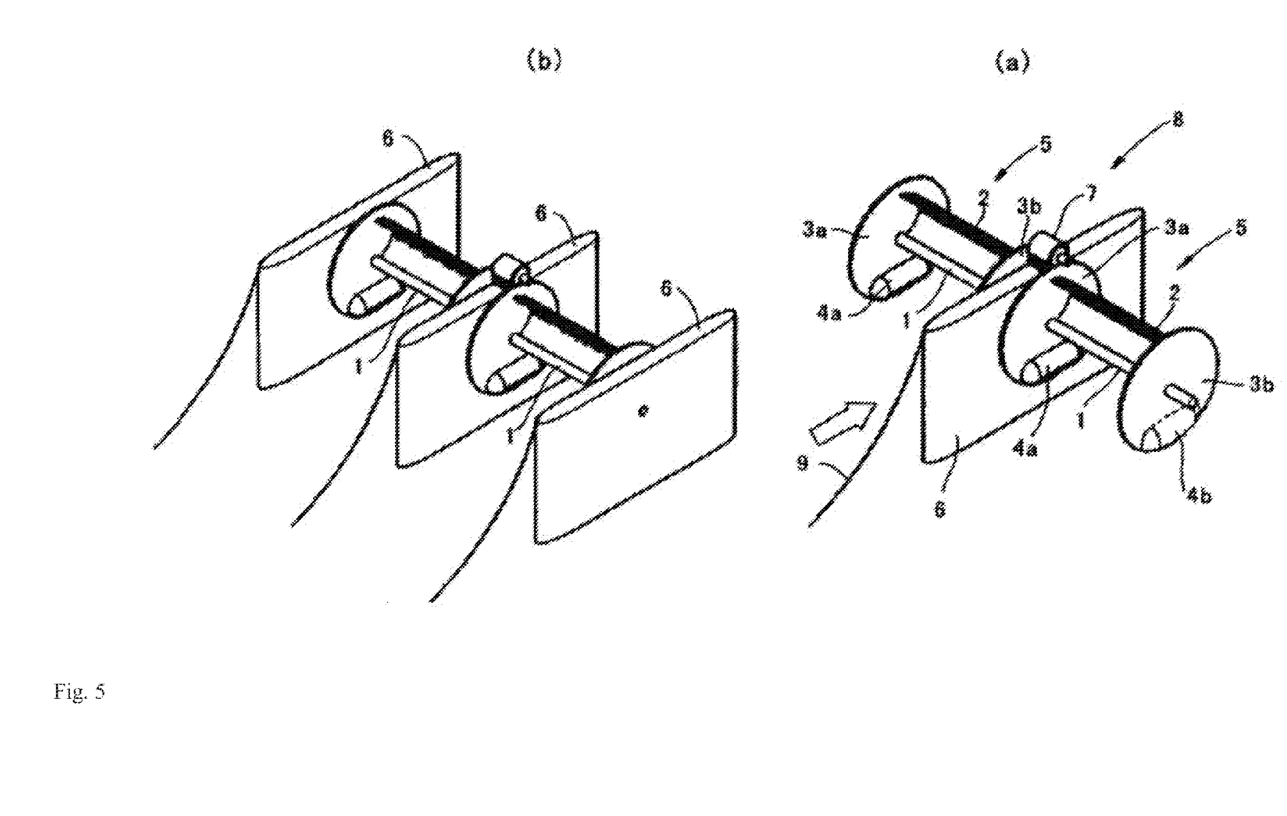
FIG. 5 is a set of perspective views of a single bucket drag-type turbine in accordance with a first embodiment of the present invention and a wave power generator comprising the aforesaid turbine. (a) shows a structure comprising two turbines and single float and (b) shows a structure comprising two turbines and three floats

As shown in FIG. 5(a), a single bucket drag-type turbine 5 is constituted of a rotation shaft 1, a bucket 2 formed as a semi-cylindrical body of semicircular arcuate cross-section fixed to the rotation shaft 1 at one end of the semicircular arc, a circular end plate 3a fixed to one longitudinal end of the bucket 2, a circular end plate 3b fixed to the other longitudinal end of the bucket 2, and a pair of counter weights 4a and 4b of streamline shape fixed to the end plates 3a and 3b and opposing the bucket 2 with the rotation shaft 1 located between them. The rotation shaft 1 passes through centers of end plates 3a and 3b. The end plates 3a and 3b cross the rotation shaft 1 at right angles. The single bucket drag-type turbine 5 is one of the embodiments of the single bucket drag-type turbine shown in FIG. 3.

A pair of single bucket drag-type turbines 5 are integrally united with their rotation shafts 1 aligned, so that one end of the rotation shaft 1 of one of the single bucket drag-type turbines 5 passing through the end plate 3a abuts against one end of the rotation shaft 1 of the other of the single bucket drag-type turbines 5 passing through the end plate 3b. The rotation shaft 1 extending between the end plates 3a and 3b adjacent to each other rotatably passes through a float 6. Upper end portions of the end plates 3a and 3b sandwiching the float 6 are located above the upper end of the float 6.

A drive shaft of a generator 7 fixed to the upper end of the float 6 operatively engages upper ends of end plates 3a and 3b opposing each other with the float 6 inserted between them.

The aforementioned members constitute a wave power generator 8.

The wave power generator 8 is maintained at sea level by the float 6 connected through a mooring cable 9 to an anchor such as a tetrapod not shown in FIG. 5, which is installed in a seabed, whereby the rotation shaft 1 is directed at right angles to the moving direction of waves indicated by a blank arrow in FIG. 5(a), and a major part of the float 6 other than the upper end part is submerged. When waves pass by the single bucket drag-type turbine 5, the lower part of the single bucket drag-type turbine 5 is constantly submerged, but the upper end part of the single bucket drag-type turbine 5 repeats submersion and surfacing.

The rotation shaft 1 oscillates due to waves. However, the oscillation of the rotation shaft 1 is suppressed to the minimum level by adjusting the size and weight of the float 6 so as to make the period of characteristic oscillation of the float 6 different from the period of waves.

When the water is shallow, the single bucket drag-type turbine 5 can be supported by a bottom seated support member.

As aforementioned, the maximum radius of the elliptical orbital motion of fluid particles in waves is equal to half the amplitude of the wave. Therefore, the diameter of the single bucket drag-type turbine 5 is set at a level equal to the maximum wave height of waves from which energy is to be extracted.

Operation of the single bucket drag-type turbine 5 and the wave power generator 8 will be described.

Figure 6:
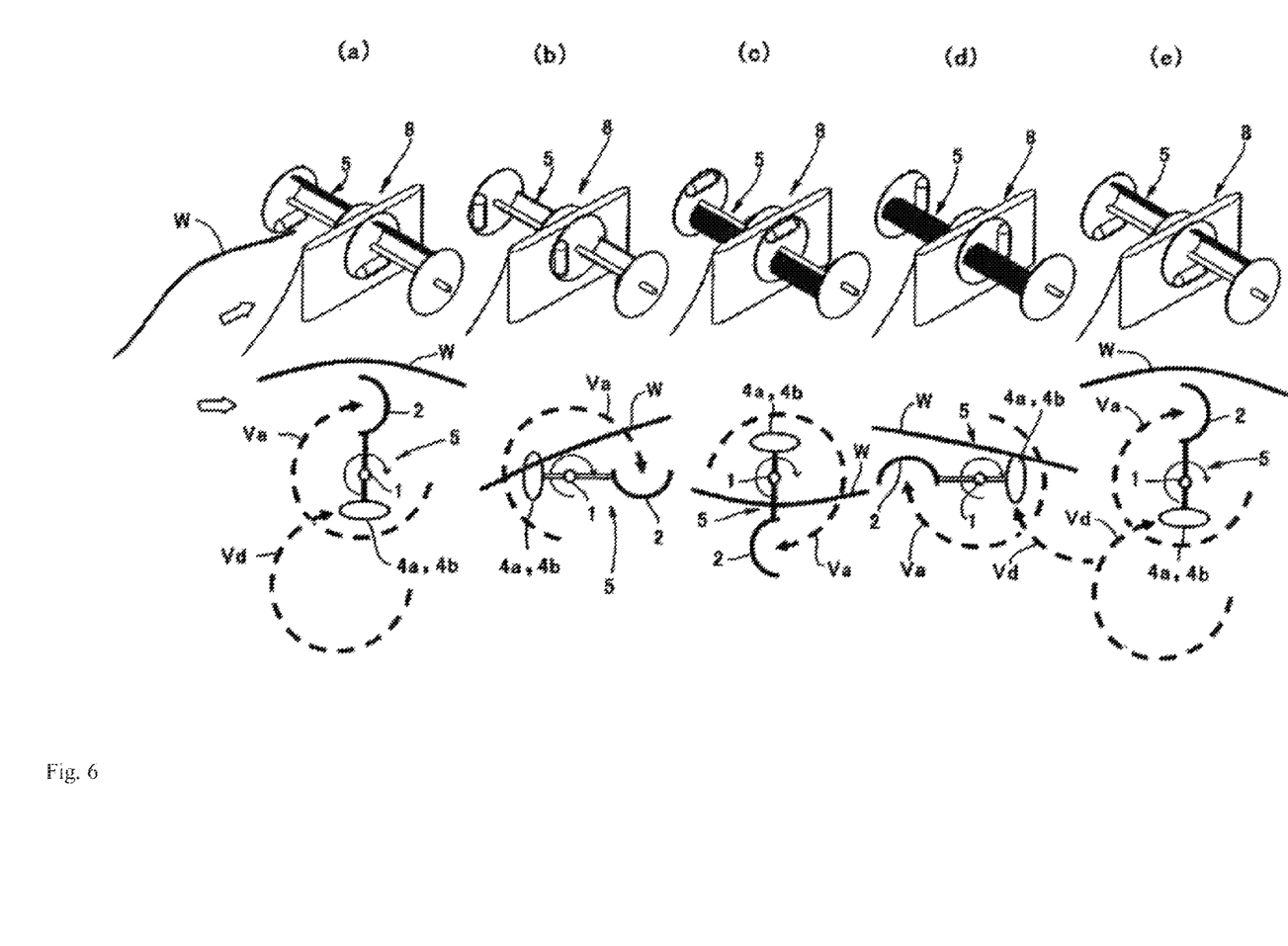
FIG. 6 is a set of views showing operation of the single bucket drag-type turbine and the wave power generator of FIG. 5 in a time series manner when a single wave passes by them.

A wave W, indicated by blank arrows in FIG. 6(a), passes by the wave power generator 8. When the wave W passes by the wave power generator 8, relations among phase of the wave W, phases of velocity vectors Va and Vd of fluid particles, phase of the bucket 2 of the single bucket drag-type turbine 5 and phases of the counter weights 4a and 4b change as shown in FIGS. 6(a) to 6(e) in a time series manner. As can be seen from FIGS. 6(a) to 6(e), the bucket 2 assumes the highest position when the crest of the wave W comes to the position of the single bucket drag-type turbine 5; the bucket 2 is impelled by fluid particles whose phase of velocity vector Va changes with passage of the wave W so as to rotate around the rotation shaft 1; the bucket 2 reaches the lowest position when the bottom of the wave W arrives at the position of the single bucket drag-type turbine 5, and the bucket 2 further rotates to return to the highest position when the wave continues to pass by the single bucket drag-type turbine 5 and the crest of the next wave W comes to the position of the single bucket drag-type turbine 5. The bucket 2 rotates once during one cycle of the wave W.

The wave cycle sometimes does not synchronize with the rotation cycle of the bucket 2 because the actual wave cycle is not constant. A situation wherein the rotation cycle of the bucket 2 becomes shorter than the wave cycle is restrained by counter torque imparted to the single bucket drag-type turbine 5 by the generator 7. A situation wherein the rotation cycle of the bucket 2 becomes longer than the wave cycle is restrained by operations of the end plates 3a and 3b as flywheels. Therefore, a situation wherein the wave cycle largely differs from the rotation cycle of the bucket 2 is prevented.

The rotation velocity of the single bucket drag-type turbine 5 fluctuates when the wave length fluctuates. Synchronization or non-synchronization with wave length does not seriously affect efficiency of energy absorption.

The distances between the buckets 2 and the counter weights 4a, 4b are far shorter than the wavelength of the wave W. Therefore, as can be seen from FIGS. 6(a) to 6(e), the buckets 2 and the counter weights 4a, 4b are located in velocity vectors Va, Vd of substantially the same phase. However, the force imparted to the buckets 2 by the fluid particles and the force imparted to the counter weights 4a, 4b of streamline shape by the fluid particles do not cancel each other because the former is far larger than the latter. Therefore, the single bucket drag-type turbine 5 can efficiently extract orbital kinetic energy from the fluid particles in the wave W to convert it to its own rotational kinetic energy.

The end plates 3a and 3b help to maintain the two-dimensionality of the wave W passing by the buckets 2 so as to stabilize the rotations of the buckets 2.

As aforementioned, the end plates 3a and 3b operate as flywheels so as to increase moment of inertia of the single bucket drag-type turbine 5, thereby helping to uniformize the rotation velocity of the turbine.

The rotational kinetic energy of the single bucket drag-type turbine 5 is converted to electric power by the generator 7, whose drive shaft operatively engages the upper ends of the end plates 3a and 3b sandwiching the float 6. Thus, the wave power generator 8 can efficiently convert the orbital kinetic energy of fluid particles in the wave W extracted by the single bucket drag-type turbine 5 to electric power.

As shown in FIG. 5(b), each rotation shaft 1 in FIG. 5(a) can be connected to another float at the end distant from the float 6 so as to increase the number of floats.

The assembly shown in FIG. 5(b) constituted of a pair of single bucket drag-type turbines 5 and three floats 6 can be assembled with other single bucket drag-type turbines 5 and floats 6 so as to enlarge the collective body of single bucket drag-type turbines 5 along the extending direction of the rotation shafts 1.

Embodiment No. 2

Figure 7:
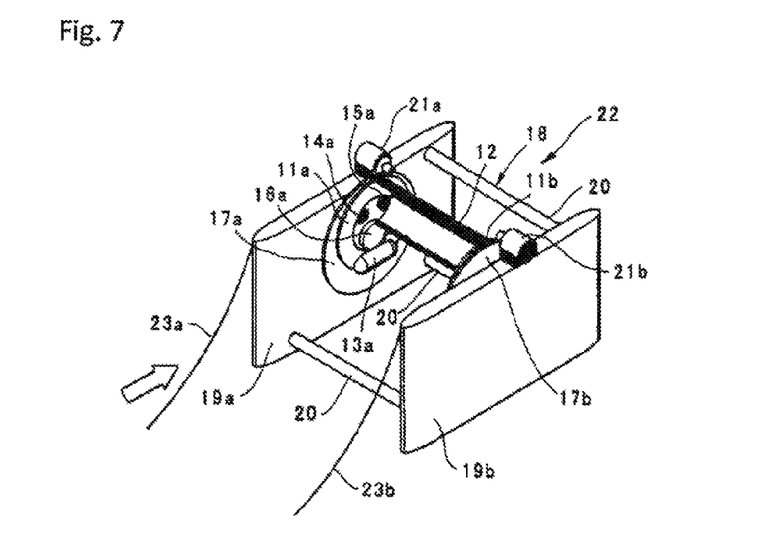
FIG. 7 is a perspective view of a single bucket drag-type turbine in accordance with a second embodiment of the present invention and a wave power generator comprising the aforesaid turbine.
Figure 8:
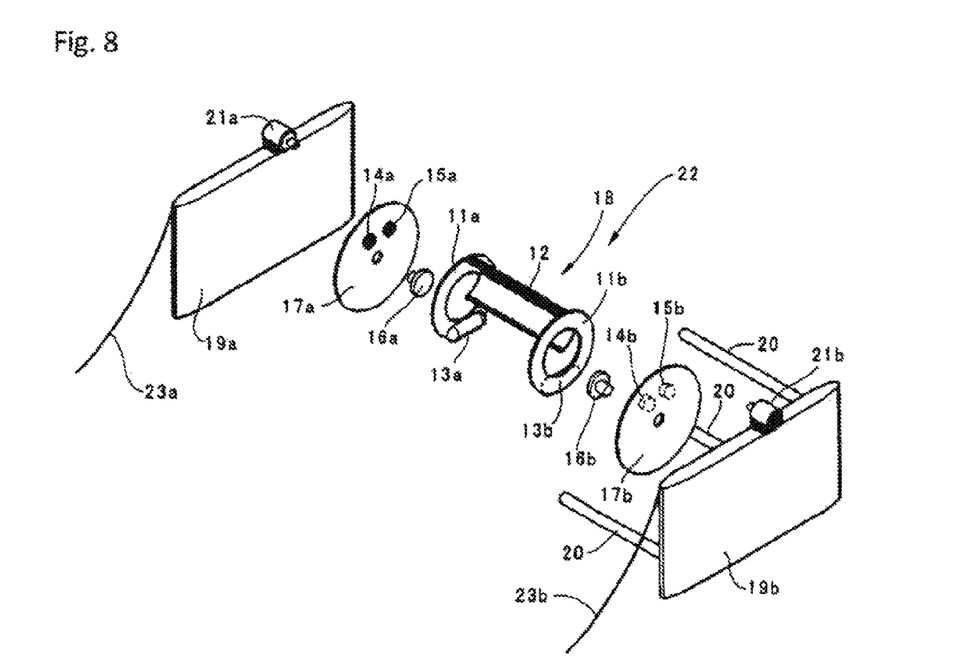
FIG. 8 is an exploded perspective view of the single bucket drag-type turbine in accordance with the second embodiment of the present invention and the wave power generator comprising the aforesaid turbine.

As shown in FIGS. 7 and 8, a single bucket drag-type turbine 18 is constituted of a pair of rings 11a and 11b, a semi-cylindrical bucket 12 fixed to the ring 11a at one longitudinal end and fixed to the ring 11b at the other longitudinal end, a pair of streamline shaped counter weights 13a and 13b fixed to the rings 11a and 11b so as to oppose the bucket 12 across centers of the rings 11a and 11b, a driving wheel 17a provided with a pair of guide rollers 14a and 15a rotatably connected to radial middle portions of the driving wheel 17a so as to abut the inner circumferential surface of the ring 11a and a fixed wheel 16a passing through the center of the driving wheel 17a to be capable of rotation relative to the driving wheel 17a and abutting the inner circumferential surface of the ring 11a, and a driving wheel 17b, provided with a pair of guide rollers 14b and 15b rotatably connected to radial middle portions of the driving wheel 17b so as to abut the inner circumferential surface of the ring 11b and a fixed wheel 16b passing through the center of the driving wheel 17b to be capable of rotation relative to the driving wheel 17b and abutting the inner circumferential surface of the ring 11b. The fixed wheel 16a passes through the driving wheel 17a so as to be fixed to a float 19a, and the fixed wheel 16b passes through the driving wheel 17b so as to be fixed to a float 19b. The rings 11a and 11b are formed as internal gears and portions of the fixed wheels 16a and 16b abutting the rings 11a and 11b are formed as external gears. Internal teeth of the rings 11a and 11b mesh with external teeth of the fixed wheels 16a and 16b. Thus, the rings 11a and 11b can go around the fixed wheels 16a and 16b without slipping.

The inner diameter of the rings 11a and 11b is set at twice the outer diameter of the fixed wheels 16a and 16b. Thus, while the bucket 2 rotates once, contact points between the inner circumferential surfaces of the rings 11a, 11b and outer circumferential surfaces of the fixed wheels 16a, 16b go around the fixed wheels 16a and 16b twice. While contact points between the inner circumferential surfaces of the rings 11a, 11b and the outer circumferential surfaces of the fixed wheels 16a, 16b go around the fixed wheels 16a and 16b twice, the guide rollers 14a, 15a and 14b, 15b go around the fixed wheels 16a and 16b twice, and thus, the driving wheels 17a and 17b go around the fixed wheels 16a and 16b twice.

Figure 9:
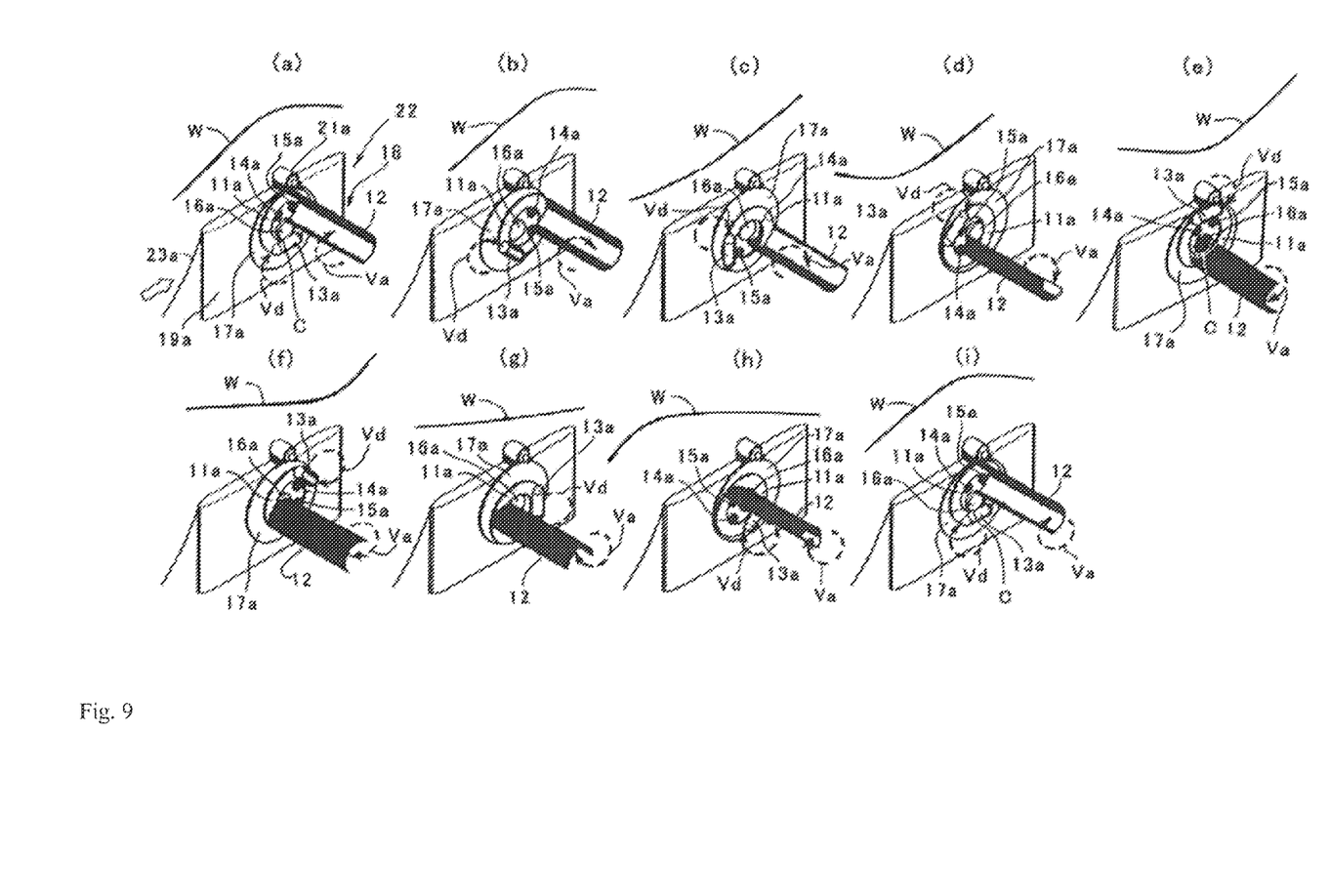
FIG. 9 is a set of views showing operation of the single bucket drag-type turbine and the wave power generator of FIG. 7 in a time series manner when a single wave passes by them.

As shown in FIG. 9(a), the single bucket drag-type turbine 18 is assembled so that a rotation center C of the bucket 12 formed of the contact points between the inner circumferential surfaces of the rings 11a, 11b and outer circumferential surfaces of the fixed wheels 16a, 16b is at the lowest position when the bucket 12 is at the highest position.

The single bucket drag-type turbine 18 is an embodiment of the single bucket drag-type turbine shown in FIG. 4 configured to adapt to downwardly-decreasing flow velocity of fluid particles. The bucket 12 corresponds to the bucket A in FIG. 4, the rings 11a and 11b correspond to the ring E in FIG. 4, and the fixed wheels 16a and 16b correspond to the fixed wheel F in FIG. 4.

Upper end portions of the driving wheels 17a and 17b are located above the upper ends of the floats 19a and 19b. The floats 19a and 19b are connected to each other by a plurality of transverse supporting braces 20. Drive shafts of generators 21a and 21b fixed on the upper ends of the floats 19a and 19b operatively engage the upper end portions of the driving wheels 17a and 17b.

The aforementioned members constitute a wave power generator 22.

The wave power generator 22 is maintained at sea level by the floats 19a and 19b connected through mooring cables 23a and 23b to an anchor such as a tetrapod, not shown in FIG. 7, installed in the seabed; the longitudinal direction of the bucket 12 is directed at right angles to the moving direction of waves indicated by a blank arrow in FIG. 7; and a major part of the floats 19a and 19b other than their upper end portions is submerged. When waves pass by the single bucket drag-type turbine 18, the lower portion of the single bucket drag-type turbine 18 is constantly submerged, but the upper end portion of the single bucket drag-type turbine 18 repeats submersion and surfacing.

Operation of the single bucket drag-type turbine 18 and the wave power generator 22 will be described.

A wave W, whose moving direction is indicated by a blank arrow in FIG. 9(a), passes by the wave power generator 22. When the wave W passes by the wave power generator 22, relations among the phase of the wave W, phases of velocity vectors Va and Vd of fluid particles, phase of the bucket 12 of the single bucket drag-type turbine 18 and phases of the counter weights 13a and 13b of the single bucket drag-type turbine 18 change as shown in FIGS. 9(a) to 9(i) in a time series manner. As can be seen from FIGS. 9(a) to 9(i), insofar as the bucket 12 is at the highest position when the crest of the wave W comes to the position of the single bucket drag-type turbine 18, the bucket 12 is impelled by fluid particles whose phase of velocity vector Va changes with passage of the wave W so as to rotate around the fixed wheels 16a and 16b; the bucket 12 comes to the lowest position when the bottom of the wave W comes to the position of the single bucket drag-type turbine 18; and the bucket 12 further rotates to return to the highest position when the wave continues to pass by the single bucket drag-type turbine 18 and the crest of the next wave W comes to the position of the single bucket drag-type turbine 18. The bucket 12 rotates once during one cycle of the wave W, while the driving wheels 17a and 17b rotate twice during one cycle of the wave W.

The wave cycle sometimes does not synchronize with the rotation cycle of the bucket 12 because the actual wave cycle is not constant. A situation wherein the rotation cycle of the bucket 12 becomes shorter than the wave cycle is restrained by counter torque imparted to the single bucket drag-type turbine 18 by the generators 21a and 21b. A situation wherein the rotation cycle of the bucket 12 becomes longer than the wave cycle is restrained by the flywheel effect of the rings 11a, 11b and the driving wheels 17a, 17b. Therefore, a situation wherein the wave cycle largely differs from rotation cycle of the bucket 12 is prevented.

The distances between the bucket 12 and the counter weights 13a, 13b are far shorter than the wavelength of the wave W. Therefore, as can be seen from FIGS. 9(a) to 9(i), the bucket 12 and the counter weights 13a, 13b are located in velocity vectors Va, Vd of substantially the same phase. However, the force imparted to the bucket 12 by the fluid particles and forces imparted to the counter weights 13a, 13b of streamline shape by the fluid particles do not cancel each other because the former is far larger than the latter. Therefore, the single bucket drag-type turbine 18 can efficiently extract orbital kinetic energy from the fluid particles in the wave W to convert its own rotational kinetic energy.

The rings 11a, 11b and the driving wheels 17a, 17b help to maintain the two-dimensionality of the wave W passing by the buckets 12 so as to stabilize the rotation of the bucket 12.

As aforementioned, the rings 11a, 11b and the driving wheels 17a, 17b operate as flywheels so as to increase the moment of inertia of the single bucket drag-type turbine 18, thereby helping to uniformize the rotation velocity of the turbine.

The rotational kinetic energy of the single bucket drag-type turbine 18 is converted to electric power by the generators 21a and 21b, whose drive shafts operatively engage the upper ends of the driving wheels 17a and 17b. Thus, the wave power generator 22 can efficiently convert the orbital kinetic energy of fluid particles in the wave W extracted by the single bucket drag-type turbine 18 to electric power.

As can be seen from FIGS. 9(a) to 9(i), the distance between the rotation center C of the bucket 12, or the abutting points between the inner circumference surfaces of the rings 11a, 11b and the outer circumference surfaces of the fixed wheels 16a, 16b, and the bucket 12 becomes maximum when the bucket 12 is located vertically above the rotation center C (see FIGS. 9(a), 9(i)), decreases as the bucket 12 descends, and becomes minimum when the bucket 12 is located vertically below the rotation center C (see FIG. 9(e)). Therefore, even if the bucket 12 rotates at a constant angular velocity, the circumferential velocity of the bucket 12 becomes low when the bucket 12 is in a lower position where its circumferential velocity comes close to the flow velocity of the fluid particles. which decreases as distance from water surface increases, so that generation of a negative pressure region behind the bucket 12 is prevented and the fluid particles are prevented from resisting the rotation of the bucket 12.

The cross-sectional shape of the buckets 2 and 12 is not restricted to semi-circular arc. The buckets 2 and 12 can be of half-pipe shape or a split-pipe shape substantially equal to a half-pipe shape, provided with a bent or curved cross section convex to the rotating direction of the buckets 2 and 12.

The shape of the counter weights 4a, 4b, 13a and 13b is not restricted to streamline shape. The counter weights 4a, 4b, 13a and 13b can be of any shape having low resistance to the flow of fluid particles.

INDUSTRIAL APPLICABILITY

The present invention can be widely used for wave power generators.

BRIEF DESCRIPTION OF THE REFERENCE NUMERALS

A, B, 2, 12 Bucket
C Rotation center
D, 4a, 4b, 13a, 13b Counter weight
5, 18 Single bucket drag-type turbine
6, 19a, 19b Float
7, 21a, 21b Generator
E, 11a, 11b Ring
F, 16a, 16b Fixed wheel
17a, 17b Driving wheel
8, 22 Wave power generator
W Wave
Va, Vb Velocity vector of fluid particles

The invention claimed is:

1. A single bucket drag-type turbine comprising: a single half-pipe bucket and a counterweight oppositely facing the bucket, wherein fluid particles in orbital motion in a wave impel the bucket and the counterweight to rotate them as a unitary body.

2. A single bucket drag-type turbine of claim 1, wherein the bucket is a semi-cylindrical body and the counterweight is a streamline body.

3. A wave power generator comprising a single bucket drag-type turbine of claim 1, a float for rotatably supporting the single bucket drag-type turbine, and a power generator connected to the float to be rotated by the single bucket drag-type turbine.

4. A single bucket drag-type turbine comprising:
a single half-pipe bucket and a counterweight oppositely facing the bucket, wherein fluid particles in orbital motion in a wave impel the bucket and the counterweight to rotate them as a unitary body; and
a pair of end plates each fixed to one of longitudinal ends of the bucket, wherein each end plate is provided with the counterweight.

5. A single bucket drag-type turbine of claim 4, wherein distance between the bucket and a rotation center of the bucket when the bucket is located below the rotation center of the bucket is shorter than that when the bucket is located above the rotation center of the bucket during rotational motion of the bucket and the counterweight as a unitary body.

6. A single bucket drag-type turbine of claim 5, wherein each end plate is a ring, and the single bucket drag-type turbine further comprises a pair of driving wheels, wherein each driving wheel is provided with a pair of rotatable guide rollers located at the radial middle of the driving wheel and a fixed wheel passing through the center of the driving wheel to be capable of rotation relative to the driving wheel, the pair of rotatable guide rollers and the fixed wheel abut an inner circumferential surface of one of the rings, an inner diameter of the ring is twice as large as an outer diameter of the fixed wheel, and the ring rotates around the fixed wheel without slipping at an abutting point between the ring and the fixed wheel.

7. A single bucket drag-type turbine of claim 6, wherein the ring is an internal gear and a part of the fixed wheel abutting the inner circumferential surface of the ring is an external gear, and the internal gear of the ring and the external gear of the fixed wheel mesh with each other.

* * * * *